US009553785B2

(12) United States Patent
Bragstad et al.

(10) Patent No.: US 9,553,785 B2
(45) Date of Patent: *Jan. 24, 2017

(54) SMART MIGRATION OF OVERPERFORMING OPERATORS OF A STREAMING APPLICATION TO VIRTUAL MACHINES IN A CLOUD

(71) Applicant: International Business Machines Corporation, Armonk, NY (US)

(72) Inventors: Lance Bragstad, Pine Island, MN (US); Michael J. Branson, Rochester, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 427 days.

This patent is subject to a terminal disclaimer.

(21) Appl. No.: 14/277,843

(22) Filed: May 15, 2014

(65) Prior Publication Data
US 2015/0281316 A1 Oct. 1, 2015

Related U.S. Application Data

(63) Continuation of application No. 14/227,808, filed on Mar. 27, 2014.

(51) Int. Cl.
H04L 29/08 (2006.01)
H04L 12/26 (2006.01)
H04L 29/06 (2006.01)
H04L 12/24 (2006.01)
G06F 9/455 (2006.01)
(Continued)

(52) U.S. Cl.
CPC ....... *H04L 43/0876* (2013.01); *G06F 9/45558* (2013.01); *H04L 41/0806* (2013.01); *H04L 65/60* (2013.01); *H04L 65/80* (2013.01); *H04L 67/10* (2013.01); *H04L 67/1025* (2013.01); *H04L 67/2814* (2013.01); *G06F 9/466* (2013.01); *G06F 17/30516* (2013.01); *G06F 2009/4557* (2013.01)

(58) Field of Classification Search
CPC .... H04L 43/04; H04L 65/60; G06F 17/30516; G06F 2009/4557
See application file for complete search history.

(56) References Cited

U.S. PATENT DOCUMENTS 7,613,797 B2   11/2009   Stefaniak et al.
7,836,195 B2   11/2010   Veal et al.
8,117,329 B2   2/2012    Lisitsa et al.
(Continued)

*Primary Examiner* — Barbara Burgess
(74) *Attorney, Agent, or Firm* — Martin & Associates, LLC; Bret J. Petersen

(57) ABSTRACT

A streams manager monitors performance of a streaming application on a physical machine, and determines operators that are underperforming and operators that are overperforming. When the performance needs to be improved, the streams manager automatically modifies the flow graph to deploy one or more operators of the streaming application that are overperforming to a virtual machine in a cloud. Moving the overperforming operators off of the physical machine to a VM leaves additional resources for the underperforming operators that are left on the physical machine to improve performance of the streaming application.

11 Claims, 9 Drawing Sheets

(51) Int. Cl.
 *G06F 9/46* (2006.01)
 *G06F 17/30* (2006.01)

(56) References Cited

U.S. PATENT DOCUMENTS

| | | |
|---|---|---|
| 8,245,140 B2 | 8/2012 | Barber et al. |
| 8,332,862 B2 | 12/2012 | Isard et al. |
| 8,402,015 B2* | 3/2013 | Imaki ................ G06F 17/30516 |
| | | 707/713 |
| 8,448,080 B2 | 5/2013 | Barber et al. |
| 8,601,471 B2 | 12/2013 | Beaty et al. |
| 9,002,822 B2 | 4/2015 | Jerzak et al. |
| 9,002,823 B2 | 4/2015 | Jerzak et al. |
| 9,185,154 B2 | 11/2015 | Ball et al. |
| 9,298,485 B2* | 3/2016 | Bragstad ............. H04L 41/5019 |
| 9,379,950 B2* | 6/2016 | Bragstad ................ H04L 65/80 |
| 9,396,158 B2* | 7/2016 | Cradick ................ G06F 15/173 |
| 2006/0069761 A1 | 3/2006 | Singh et al. |
| 2013/0097592 A1 | 4/2013 | Simitsis et al. |
| 2013/0117747 A1* | 5/2013 | Balko .................... G06F 9/466 |
| | | 718/100 |
| 2013/0326529 A1 | 12/2013 | Augenstein et al. |
| 2015/0381756 A1* | 12/2015 | Lotfallah ............ H04L 67/2814 |
| | | 709/213 |

\* cited by examiner

SMART MIGRATION OF OVERPERFORMING OPERATORS OF A STREAMING APPLICATION TO VIRTUAL MACHINES IN A CLOUD

BACKGROUND

1. Technical Field

This disclosure generally relates to streaming applications, and more specifically relates enhancing performance of a streaming application executing on a physical machine by smart migration of overperforming operators of the streaming application to virtual machines in a cloud to free up resources for remaining operators on the physical machine.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

BRIEF SUMMARY

A streams manager monitors performance of a streaming application on a physical machine and determines operators that are underperforming and operators that are overperforming. When the performance needs to be improved, the streams manager automatically modifies the flow graph to deploy one or more operators of the streaming application that are overperforming to a virtual machine in a cloud. Moving the overperforming operators off of the physical machine to a VM leaves additional resources for the underperforming operators that are left on the physical machine to improve performance of the streaming application.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

Figure 7:
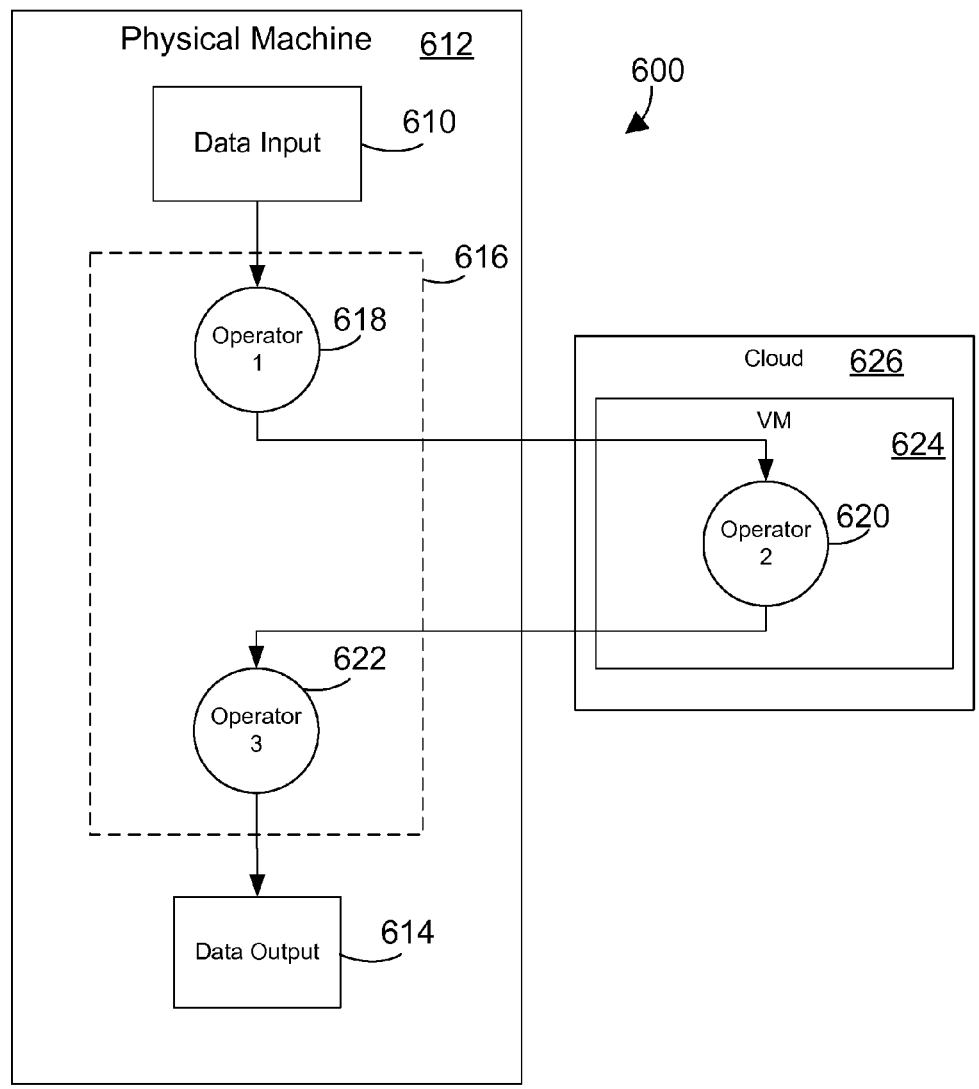
FIG. 7 illustrates a block diagram of the simplified example in FIG. 6 after relocating the overperforming operator to a VM to enhance performance of a streaming application on a physical machine.
Figure 9:
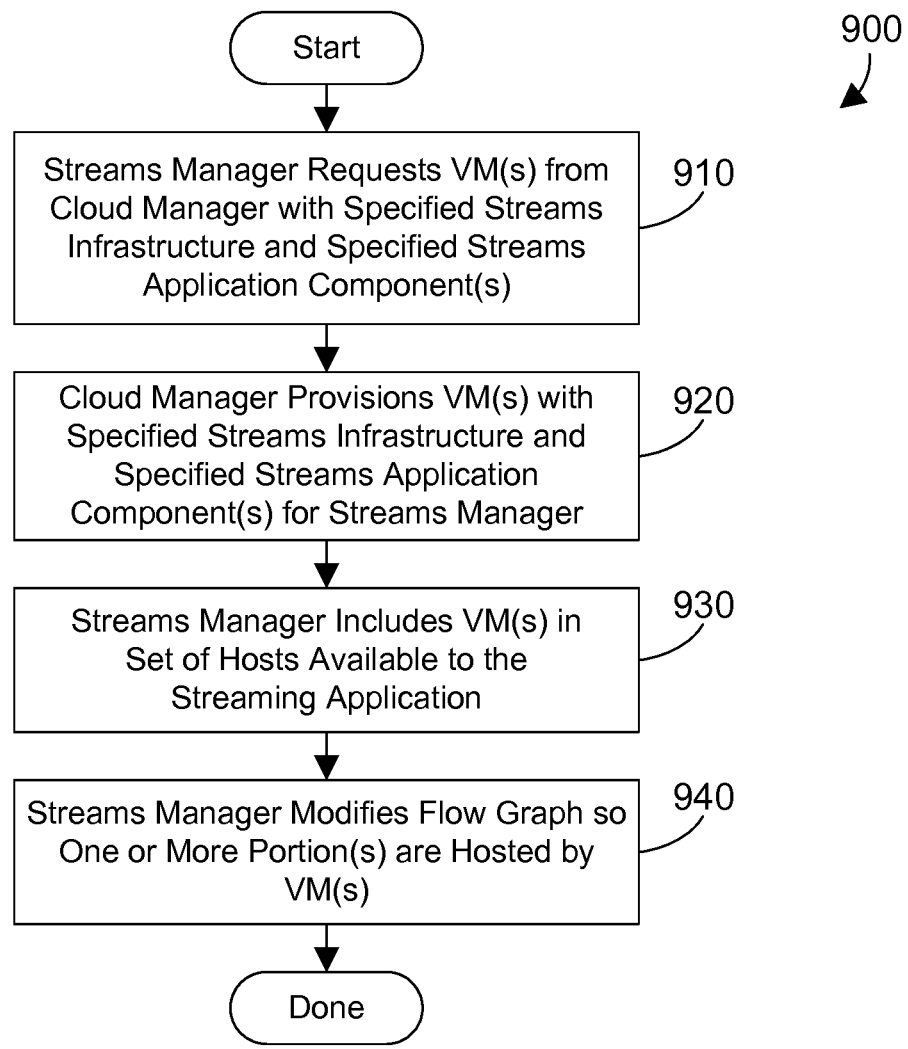
Figure 10:
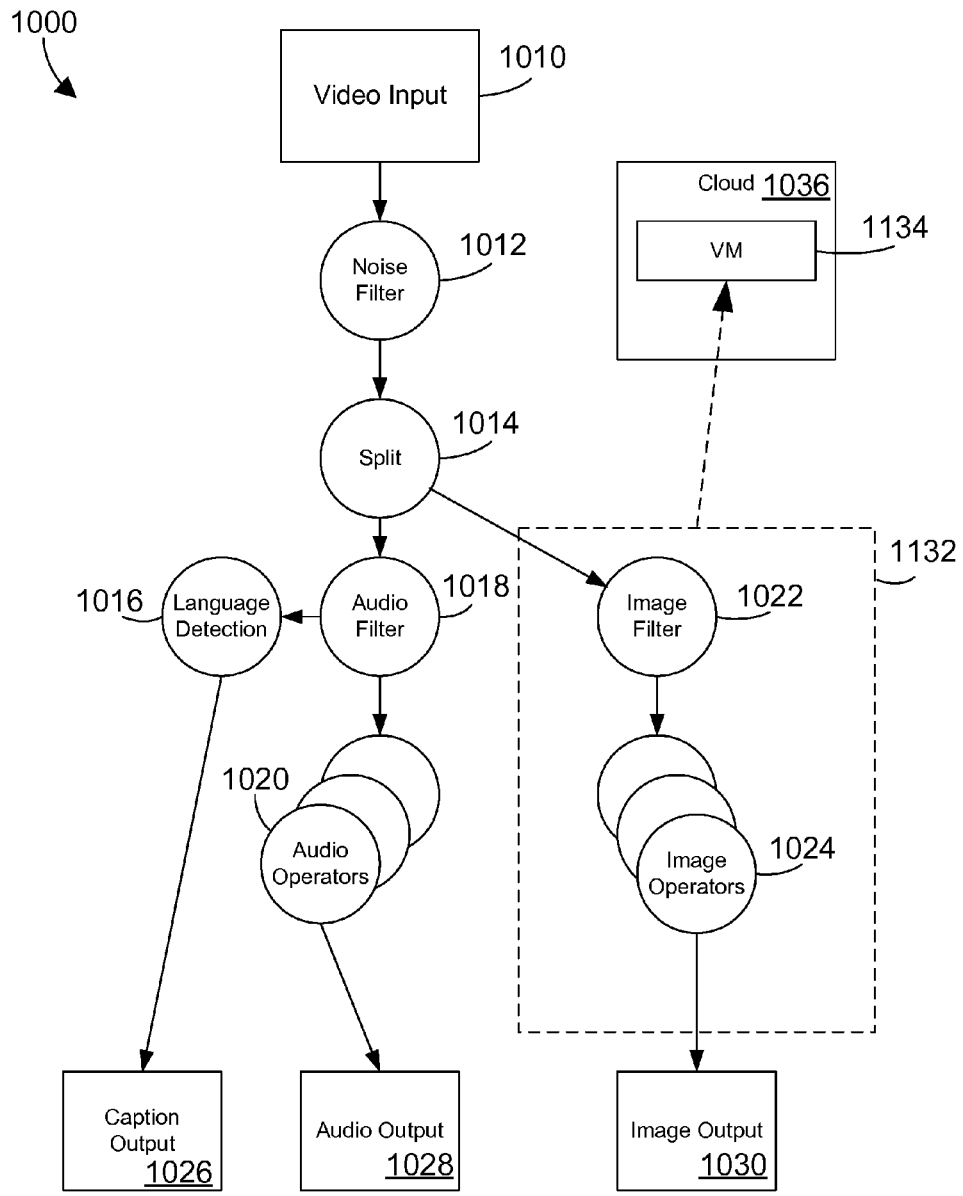

FIG. 9 is a flow diagram of a specific method for step 740 in FIG. 7 for a streams manager to deploy an operator that is overperforming to a VM in a cloud to improve performance of a streaming application; and FIG. 10 is a block diagram that illustrates another example for enhancing performance of a streaming application by deploying overperforming operators of the streaming application to a virtual machine.

DETAILED DESCRIPTION

The disclosure and claims herein relate to a streams manager that monitors performance of a streaming application on a physical machine, and determines operators that are underperforming and operators that are overperforming. When the performance needs to be improved, the streams manager automatically modifies the flow graph to deploy one or more operators of the streaming application that are overperforming to a virtual machine in a cloud. Moving the overperforming operators off of the physical machine to a VM leaves additional resources for the underperforming operators that are left on the physical machine to improve performance of the streaming application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
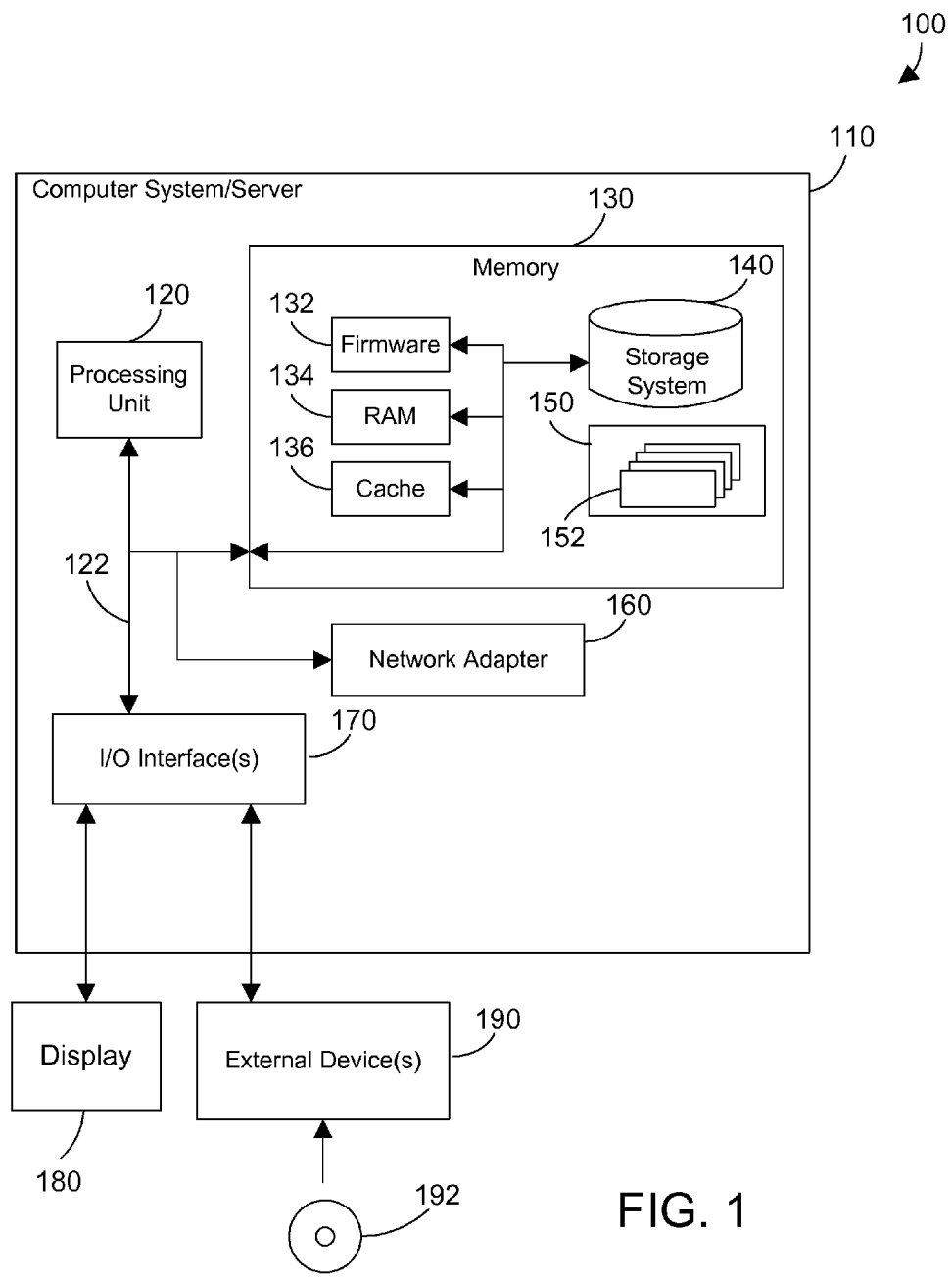
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
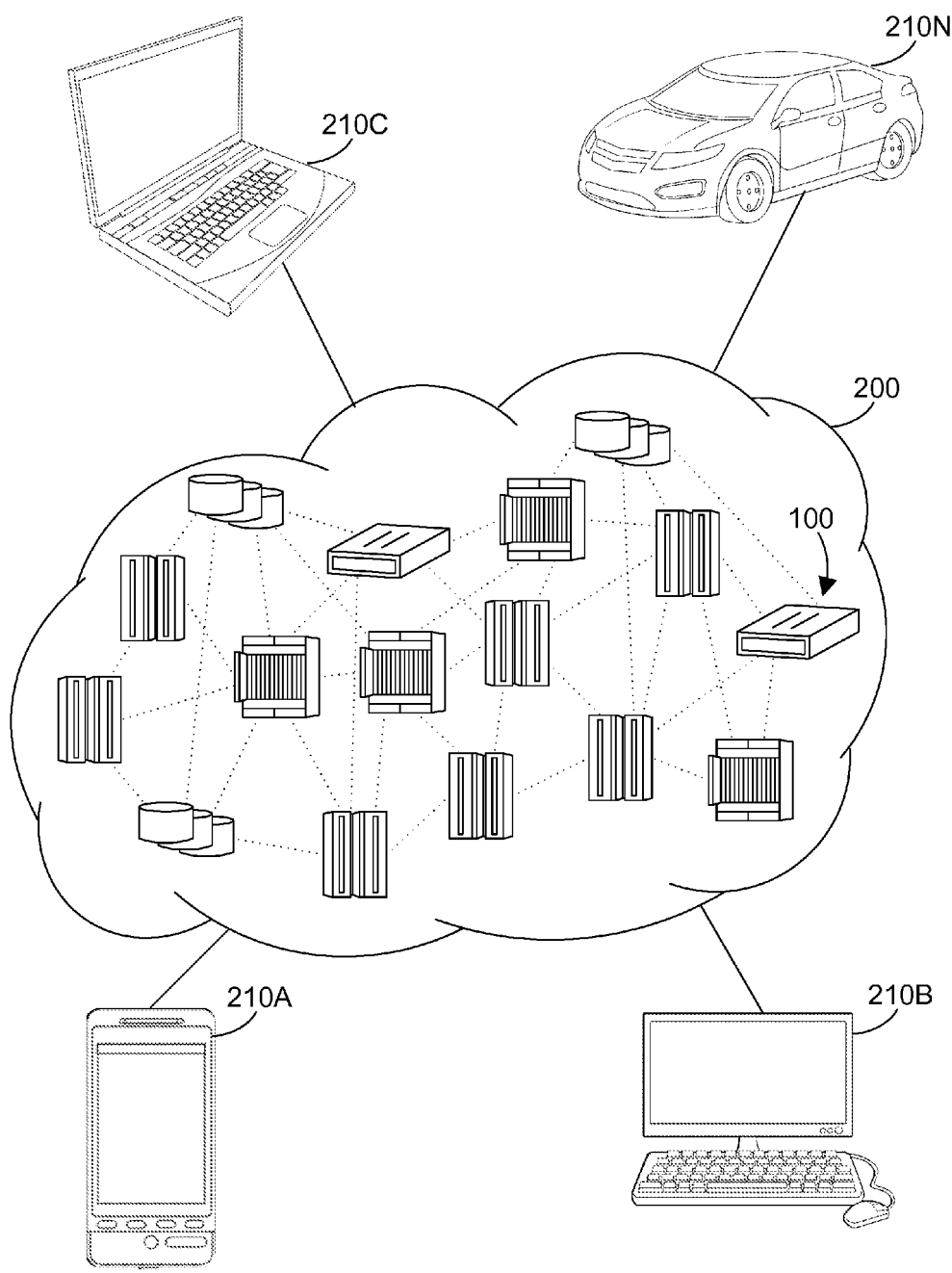
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
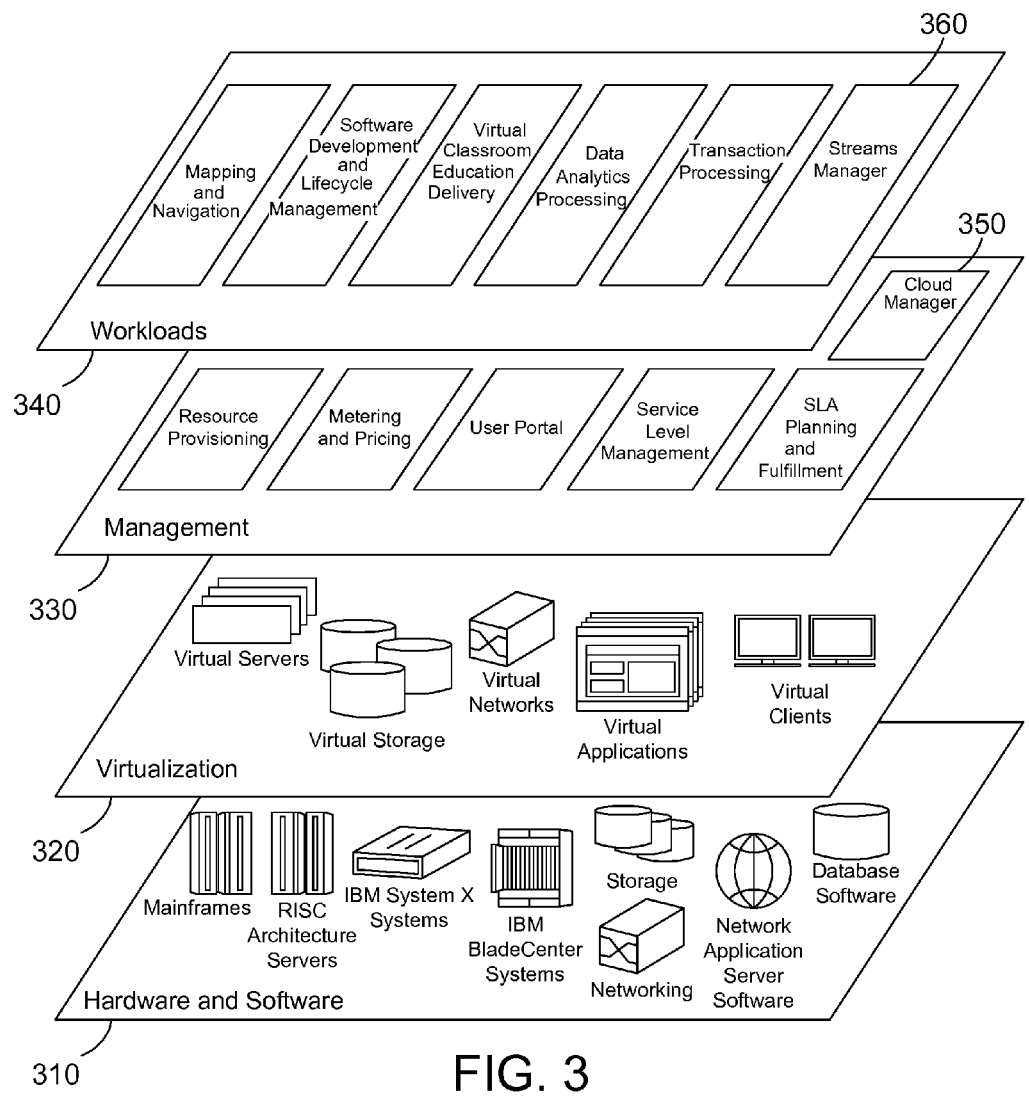
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2®, database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed in detail below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a streams manager 360, as discussed in more detail below.

The present invention may be a system, a method, and/or a computer program product. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
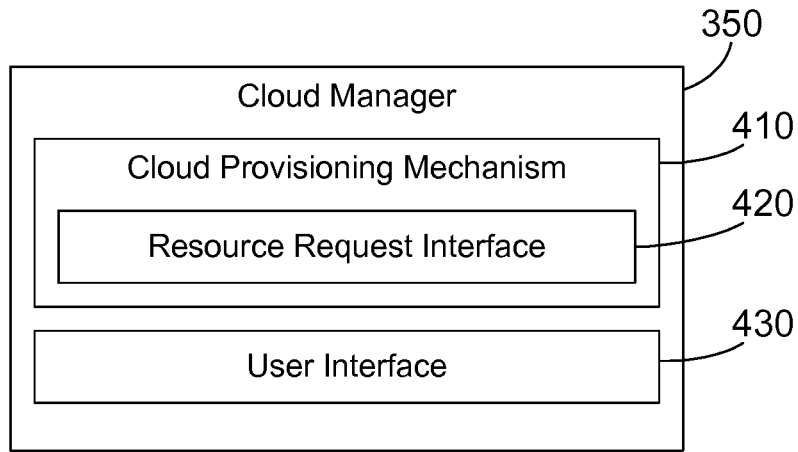
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request virtual machines from the cloud manager 350 without human intervention. The cloud manager 350 also includes a user interface 430 that allows a user to interact with the cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the cloud mechanism 350 without input from a human user. Of course, cloud manager 350 could include many other features and functions known in the art that are not shown in FIG. 4.

Figure 5:
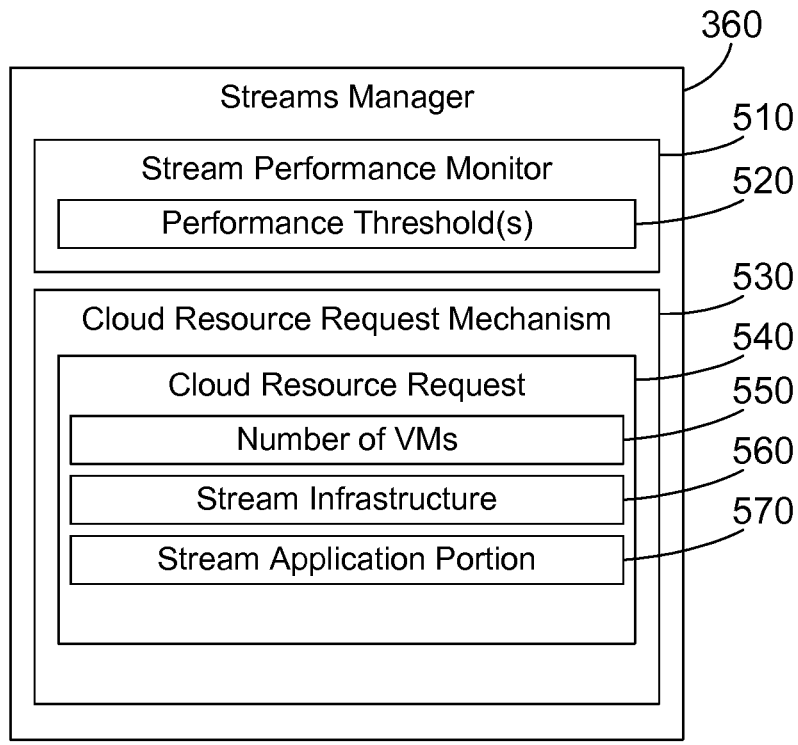
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a performance monitor 510 with one or more performance thresholds 520. Performance thresholds 520 can include static thresholds, such as percentage used of current capacity or tuple rate, and can also include any suitable heuristic for measuring performance of a streaming application as a whole or for measuring performance of one or more operators in a streaming application. Performance thresholds 520 may include different thresholds and metrics at the operator level, at the level of a group of operators, and/or at the level of the overall performance of the streaming application. The stream performance monitor 510 monitors performance of a streaming application, and when current performance compared to the one or more performance thresholds 520 indicates current performance needs to be improved, the stream performance monitor 510 communicates the need for resources to the cloud resource request mechanism 530. The cloud resource request mechanism 530, in response to the communication from the stream performance monitor, assembles a cloud resource request 530, which can include information such as a number of VMs to provision 550, stream infrastructure needed in each VM 560, and a stream application portion 570 for each VM. Once the cloud resource request 530 is formulated, the streams manager 360 submits the cloud resource request 530 to a cloud manager, such as cloud manager 350 shown in FIGS. 3 and 4.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 540 in FIG. 5 could specify two VMs at 550, could specify the common stream infrastructure, such as an operating system and middleware, at 560, and could specify operator A and operator B at 570. In response, the cloud manager would provision two VMs with the common stream infrastructure, with the first of the VMs hosting operator A and the second of the VMs hosting operator B. In the alternative, the cloud resource request 540 could be formulated such that each VM is specified with its corresponding stream infrastructure and stream application portion. In this configuration, the cloud resource request would specify a first VM with the common stream infrastructure and operator A, and a second VM with the common stream infrastructure and operator B.

As described above, the streams manager 360 includes a performance monitor 510 to monitor the performance of a streaming application and the operators of the streaming application. The performance monitor determines 510 when the performance of the application can be and needs to be improved. When the performance needs to be improved, the best-performing operators may be moved to VMs to free up resources for other operators that are suffering performance problems. Improving performance requires tracking performance of the streaming application's individual operators. Performance can be determined in various ways. For example, an underperforming operator can be determined by comparing the operator performance against historical data. Logs and other records of performance indicators from the same or similar operators can be collected and compared to the current performance. Performance indicators could include for example: error rate, response time, resource utilization, etc. Underperforming and overperforming could also be determined by comparing the relative performance of the operators. The relative performance could be determined by comparing to historical patterns or the percent of resources required by the different operators. Underperforming and overperforming operators could also be determined by comparing the performance of the operators to the performance threshold(s) 520 in FIG. 5. A threshold range could also be set as an optimal performance range for an operator and anything that is outside of that range will trigger a response. If the performance is below the range the operator is underperforming and if the performance of the operator is above the range then it is overperforming. The performance range could be a combination of performance thresholds. For example, the threshold for underperforming might be a set of performance metrics while the threshold trigger for overperforming might be resource utilization.

Another method of determining an underperforming or overperforming operator is using performance thresholds. As described above, the stream performance monitor 510 in FIG. 5 monitors performance of a streaming application in accordance with one or more defined performance thresholds 520. For example, a suitable performance threshold 520 is percent of capacity used by an operator. A performance threshold of say, 80% could be specified for a specific operator. Note a performance threshold can apply to a specified operator, to a specified a group of operators, or to all operators in the streaming application. If the streaming application runs with the specific operator operating at less than 80% capacity then the operator is determined to be overperforming, But if there is an increased demand on the operator and the performance of the operator grows to exceed 80% capacity, the operator could be determined to be underperforming. In response to the operator exceeding the 80% defined performance threshold, the streams manager requests cloud resources to relieve the load on the physical machine hosting the underperforming operator. For example, the streams manager could request the cloud manager to provision a VM with streams infrastructure that supports running the an overperforming operator in the streaming application. In response, the cloud manager provisions a VM with the specified stream infrastructure and with the logic for the overperforming operator. The streams manager includes the VM in the set of hosts available to the streaming application and the streams manager then modifies the flow graph so the overperforming operator is hosted by the VM just provisioned.

Figure 6:
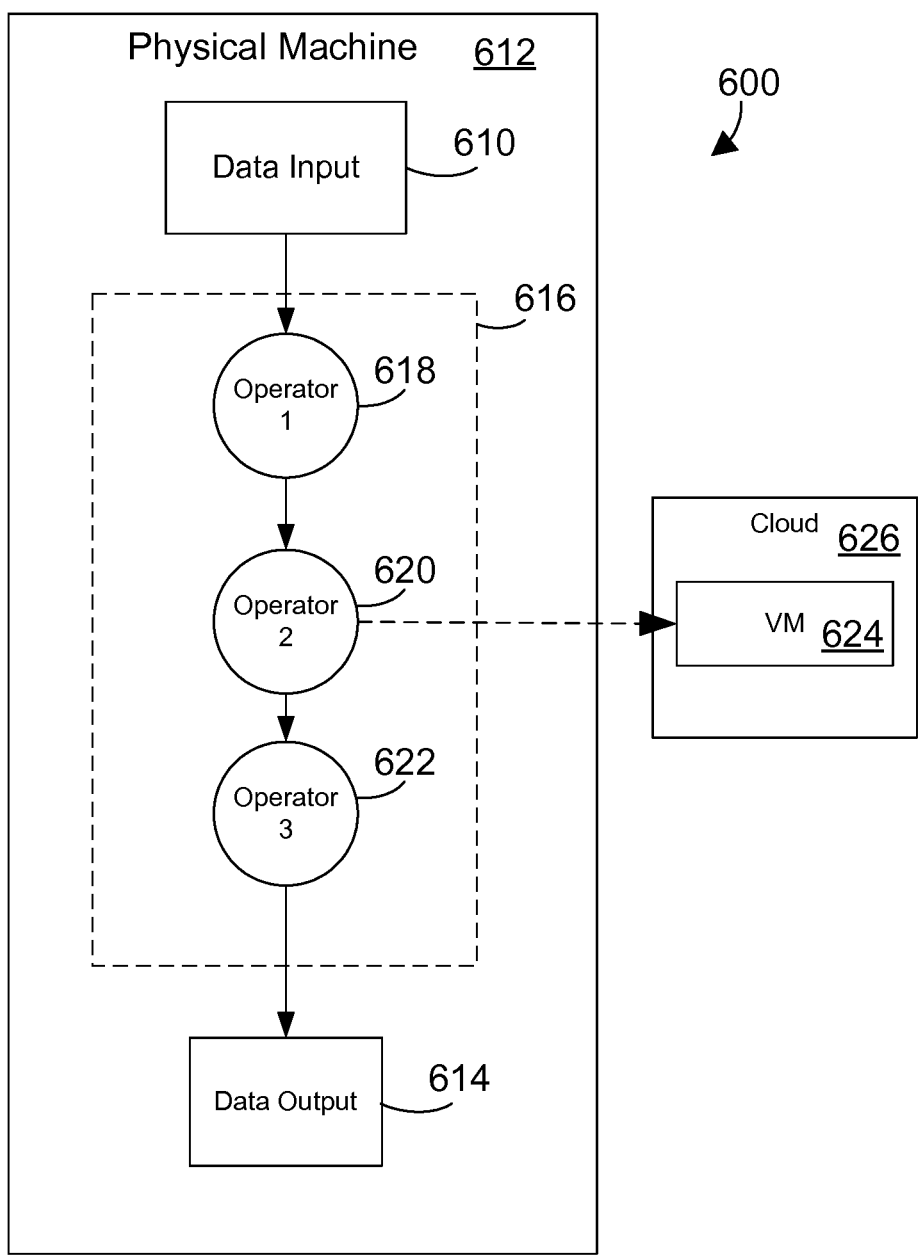
FIG. 6 illustrates a block diagram of a simplified example for relocating an overperforming operator to a VM to enhance performance of a streaming application on a physical machine.

FIG. 6 illustrates a simplified example of a system 600 for enhancing performance of a streaming application by relocating an overperforming operator to a VM. The system 600 inputs data 610 into a physical machine 612 and outputs data 614. The physical machine 612 is a dedicated computer system such as the computer system/server 100 shown in FIG. 1. The streaming application 616 has three operators 618, 620, 622. Operator 1 originates a stream of tuples, which is processed by operator 2, which outputs tuples. The tuples from operator 2 are processed by operator 3, which outputs tuples to the data output 614. The streams manager 360 (FIG. 3) monitors performance of the streaming application 616. The streams manager 360 then determines operators in the flow graph that are overperforming and operators that are underperforming. In this example, we assume Operator 2 620 is found to be overperforming and that one or both of Operator 1 618 and Operator 3 622 are underperforming. The streams manager in conjunction with the cloud manager then modifies the flow graph of the streaming application to deploy Operator 2 620 to a VM 622 in a cloud 624 as described further below. As a result, the physical machine 612 will have more resources for the previously underperforming operators of the streaming application 616 to improve the overall performance of the streaming application. FIG. 7 illustrates the simplified example of the system 600 after relocating the overperforming operator 620 to the VM 624. The result is a hybrid system, with some operators (618, 622) in the streaming application 616 hosted on the dedicated computer system, and operator 2 hosted in the cloud, thereby increasing performance of the streaming application.

Figure 8:
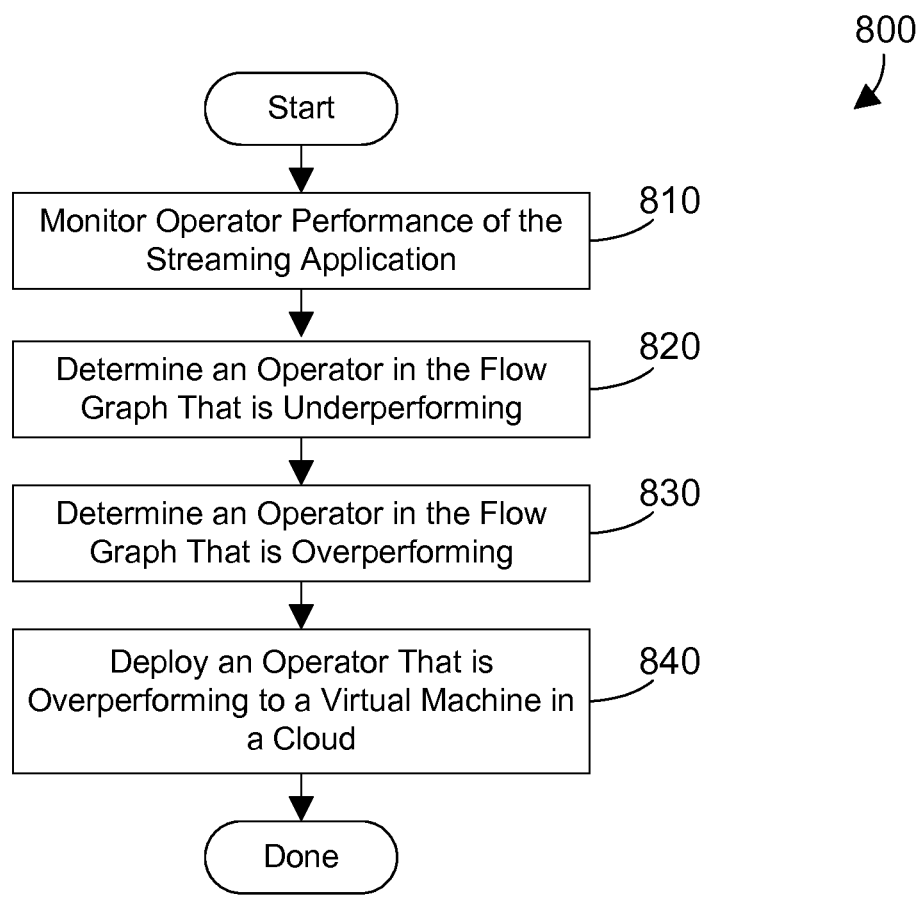
FIG. 8 is a flow diagram of a method for a streams manager to relocate an overperforming operator to a VM to enhance performance of a streaming application on a physical machine.

Referring to FIG. 8, a method 800 shows one suitable example for enhancing performance of a streaming application. Method 800 is preferably performed by the streams manager 360 and the cloud manager 350. The streams manager monitors performance of the streaming application (step 810). The streams manager determines at least one operator in the flow graph that is underperforming (step 820). The streams manager determines at least one operator in the flow graph that is overperforming (step 830). The streams manager in conjunction with the cloud manager then deploys an operator that is overperforming to a VM in the cloud (step 840). The method is then done. By deploying an overperforming operator to the cloud, more resources on the physical machine are available for the underperforming operator(s), thereby increasing performance of the streaming application.

FIG. 9 shows one suitable example for a streams manager in conjunction with the cloud manager to deploy an operator that is overperforming to a VM in a cloud. Method 900 thus shows a suitable method for performing step 840 in method 800. The streams manager requests a specified number of VMs from the cloud manager with specified streams infrastructure and one or more specified streams application components (step 910). The term "streams infrastructure" as used herein includes any software that is needed to run a component in the streaming application, such as an operating system and middleware that supports executing components in a streaming application. The term "streams application component" can include any component in a streaming application, including operators. The cloud manager provisions the VMs with the specified streams infrastructure and the one or more specified streams application components in response to the request from the streams manager (step 920). The streams manager includes the VMs in the set of hosts available to the streaming application (step 930). The streams manager then modifies the flow graph so one or more portions of the flow graph are hosted by the one or more VMs provisioned by the cloud manager (step 940). The method is then done.

FIG. 10 illustrates a specific example for enhancing performance of a streaming application by migrating or deploying overperforming operators of the streaming application to a virtual machine. In this example, the streaming application 1000 is a video and audio streaming application running on a dedicated physical computer (not shown). This dedicated physical computer may have limited physical resources such that one or more operators of the streaming application 1000 are underperforming, meaning they are operating at less than optimum performance. As described above, the streams performance manager can determine operators that are overperforming and move them to a cloud and free up local resources on this dedicated physical machine for the underperforming operators. In FIG. 10, a streaming application 1000 includes an input 1010, outputs 1026, 1028, 1030 and operators 1012 through 1024. The streaming application 1000 inputs a video/audio input 1010 and outputs processed video and audio on the outputs 1026, 1028, 1030. The video/audio input 1010 is processed by a noise filter operator 1012. The output from the noise filter 1012 is then processed by a split operator 1014 that splits the audio portion of the stream to audio filter 1018 and the video portion of the stream to an image filter operator 1022. Output from the audio filter 1018 is sent to a language detection operator 1016 which provides the caption output 1026. Output from the audio filter 1018 is also processed by audio operators 1020 which provide the audio output 1028. The split operator also outputs data to an image filter 1022. The image filter 1022 outputs data to image operators 1024 that process the image data and supply an image output 1030. In this example, we assume that the stream performance monitor determines the image portion 1032 of the streaming application 1100 is overperforming, and one or more other operators or portions of streaming application 1000 are underperforming. The image portion 1032 contains the image filter operator 1022 and one or more image operators 1024. The streams manager then determines to deploy the image portion 1032 of the streaming application to a virtual machine 1034 in a cloud 1036. As a result, the physical machine will have more resources for the previously underperforming operators of the streaming application 1000, thereby increasing the performance of the streaming application.

The disclosure and claims herein relate to a streams manager that monitors performance of a streaming application on a physical machine and determines operators that are underperforming and operators that are overperforming. Performance of the streaming application is improved by moving one or more overperforming operators off of the physical machine to a VM so that the underperforming operators that are left on the physical machine have additional resources.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, the cloud described herein could be a multi-cloud environment where the cloud manager is a multi-cloud manager such that the VMs provided to the streams manager are located on different clouds.

The invention claimed is:

1. An apparatus comprising:
   at least one processor;
   a memory coupled to the at least one processor;
   a streaming application residing in the memory and executed by the at least one processor, the streaming application comprising a flow graph that includes a plurality of operators that process a plurality of data tuples; and
   a streams manager residing in the memory and executed by the at least one processor, the streams manager monitoring performance of the streaming application, and when the streams manager determines a first operator of the flow graph is underperforming and a second operator of the flow graph is overperforming, the streams manager modifies the flow graph to move the second operator of the streaming application to a virtual machine.

2. The apparatus of claim 1 wherein the streams manager determines the first operator is underperforming by comparing current performance of the plurality of operators of the streaming application to at least one defined performance threshold.

3. The apparatus of claim 1 wherein the streams manager determines the second operator of the streaming application is overperforming by comparing the relative performance of the plurality of operators.

4. The apparatus of claim 1 wherein the streams manager determines the second operator of the streaming application is overperforming by comparing the performance of the plurality of operators against historical data.

5. The apparatus of claim 4 wherein the historical data includes records of performance indicators from the same or similar operators that are collected and compared to the current performance.

6. The apparatus of claim 5 wherein where the performance indicators include error rate, response time, and resource utilization.

7. The apparatus of claim 1 wherein the streams manager compares an operator performance to a performance range and determines the operator is overperforming when the performance is above the range and the performance is underperforming when it is below the range.

8. The apparatus of claim 1 wherein the streams manager requests a cloud manager to provision at least one virtual machine with logic to implement at least one of the plurality of operators, and when the cloud manager provisions the at least one virtual machine the streams manager then modifies the flow graph to move the overperforming operator of the streaming application to a virtual machine.

9. The apparatus of claim 8 wherein the request from the streams manager to the cloud manager to provision at least one virtual machine comprises a request that specifies:
   a number of virtual machines to provision;
   a specified streams infrastructure to provision; and
   at least one specified component of the streams application.

10. The apparatus of claim 1 wherein the streams manager communicates with a plurality of cloud managers in a multi-cloud environment.

11. The apparatus of claim 1 wherein the virtual machine is in a cloud.

* * * * *